US006467684B2

(12) United States Patent
Fite et al.

(10) Patent No.: US 6,467,684 B2
(45) Date of Patent: *Oct. 22, 2002

(54) PRE-PAID CARD SYSTEM FOR PURCHASING PRODUCTS OR SERVICES

(75) Inventors: Debra Lynn Fite, Beckville, TX (US); John Peter Doomernik, Harrison Hot Springs (CA)

(73) Assignee: Netvisions, Inc., Beckville, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,046

(22) Filed: Mar. 2, 1999

(65) Prior Publication Data

US 2001/0042784 A1 Nov. 22, 2001

(51) Int. Cl.[7] .................................................. G06K 5/00
(52) U.S. Cl. ...................... 235/379; 235/380; 235/382; 705/21
(58) Field of Search ................................. 235/379, 380, 235/381, 382, 385, 449; 902/4, 5, 27, 24; 705/14, 16, 18, 21, 22, 39, 44

(56) References Cited

U.S. PATENT DOCUMENTS

| 4,725,719 A | * | 2/1988 | Oncken et al. | 235/487 |
| 5,577,109 A | * | 11/1996 | Stimson et al. | 235/381 |
| 5,696,908 A | * | 12/1997 | Muehlberger et al. | 235/380 |
| 5,729,594 A |   | 3/1998 | Klingman | 379/93.12 |
| 5,749,075 A |   | 5/1998 | Toader et al. | 705/14 |
| 5,757,917 A |   | 5/1998 | Rose et al. | 380/25 |
| 5,774,869 A |   | 6/1998 | Toader | 705/10 |
| 5,794,221 A |   | 8/1998 | Egendorf | 705/40 |
| 5,868,236 A | * | 2/1999 | Rademacher | 194/217 |
| 5,918,909 A | * | 7/1999 | Fiala et al. | 283/61 |
| 5,991,413 A | * | 11/1999 | Arditti et al. | 235/379 |
| 5,991,748 A | * | 11/1999 | Taskett | 705/41 |
| 6,044,360 A | * | 3/2000 | Picciallo | 235/380 |
| 6,050,493 A | * | 4/2000 | Fertig | 235/487 |

FOREIGN PATENT DOCUMENTS

| CA | 2167543 |   | 7/1997 |
| DE | 19756736 A | * | 6/1999 |

OTHER PUBLICATIONS

Internetcash advertisement from "www.internetcash.com" by Verisign, 1999.*

* cited by examiner

Primary Examiner—Diane I. Lee
(74) Attorney, Agent, or Firm—Elbie R. de Kock

(57) ABSTRACT

A pre-paid card system is provided for paying for purchases over an electronic or computer network, such as the Internet. The system includes a plurality of cards each having a unique identity number associated therewith. The cards have different purchasing values. The cards are for one-time use only with no declining balance. A purchase is made by providing the card identification number to a merchant who is registered with the system, whereupon the validity of the card is verified by a host database before the purchase is completed.

11 Claims, 5 Drawing Sheets

PRE-PAID CARD SYSTEM FOR PURCHASING PRODUCTS OR SERVICES

FIELD OF THE INVENTION

This invention relates to a pre-paid card system for purchasing products or services. In particular, it relates to a system for the payment of transactions on an electronic or computer network, such as the Internet.

BACKGROUND OF THE INVENTION

With increasing use of the Internet for the purchase of goods and services, a secure method of payment has become of primary importance. The most common method of payment at the present time is with a credit card. Although some progress has been made to render credit card transactions safe, there is still considerable resistance to the use of this method of payment, not only because it requires the transmission of account details over a public network, which exposes the account to unauthorized use, but also because it lacks the anonymity that a cash transaction provides.

It is accordingly an object of the present invention to provide an alternative method of payment without the above-mentioned difficulties.

SUMMARY OF THE INVENTION

According to the invention there is provided a pre-paid card system for purchasing products or services, comprising a plurality of cards, each card having a unique identity number associated therewith and a readable memory on the card containing the identity number, the cards further having different purchasing values, for one-time use only; a host computer provided with a database for storing the identity numbers of the cards and their associated one-time purchasing values and including an indicator corresponding with each identity number which can be switched from an inactive state, in which its associated card is not available for use in payment for goods or services, to an activated state in which its associated card is available for use in the payment of goods or services; at least one activation terminal provided with means for reading the identity number of a card from the memory on the card; means for connecting the terminal to the host computer to transfer the identity number which has been read from the card to the host computer; means for comparing the identity number transferred from the activation terminal with the identity numbers in the database of the host computer for matching the transferred identity number with an identity number in the database and switching the corresponding record from said inactive to said activated state if a matching identity number with a corresponding indicator in the inactive state is found; at least one merchant computer associated with a merchant offering a product or service for sale, said merchant computer being provided with a database containing details of said product or service for sale, including the price of the product or service; means for receiving input from a purchaser identifying the product or service of said merchant being purchased and identifying the identity number of a card for use in payment of the purchase; means for transferring the identity number identified by said purchaser to the host computer; and means for comparing the identity number identified by the purchaser with the identity numbers in the database of the host computer for matching the identity number identified by the purchaser with an identity number in the database to validate the purchase if a matching identity number with a corresponding indicator in the activated state is found which is associated with a card having a purchasing value which is at least equal to the price of the product or service being purchased and disqualifying the associated card for payment of a further purchase, irrespective of whether the purchasing value of the card is equal to or larger than the purchase price.

The readable memory on the card may be contained in a magnetic strip, laser strip or other machine readable means.

According to another aspect of the invention, there is provided a system for purchasing products or services, comprising a host computer having means for generating a plurality of unique identity numbers associated with different purchasing values, for one-time use only, the host computer further being provided with a database for storing the computer generated identity numbers and their associated one-time purchasing values; at least one merchant computer associated with a merchant offering a product or service for sale, said merchant computer being provided with a database containing details of said product or service for sale, including the price of the product or service; means for receiving input from a purchaser identifying the product or service of said merchant being purchased and identifying one of said computer generated identity numbers for use in payment of the purchase; means for transferring the identity number identified by said purchaser to the host computer; and means for comparing the identity number identified by the purchaser with the identity numbers in the database of the host computer for matching the identity number identified by the purchaser with an identity number in the database to validate the purchase if a matching identity number is found which is associated with a purchasing value which is at least equal to the price of the product or service being purchased and disqualifying the identity number for payment of a further purchase, irrespective of whether the purchasing value of the identity number is equal to or larger than the purchase price.

Further objects and advantages of the invention will become apparent from the description of preferred embodiments of the invention below.

BRIEF DESCRIPTION OF THE DRAWINGS

The invention will now be described, by way of example, with reference to the accompanying drawings, in which.

DETAILED DESCRIPTION OF PREFERRED EMBODIMENTS

Figure 1:
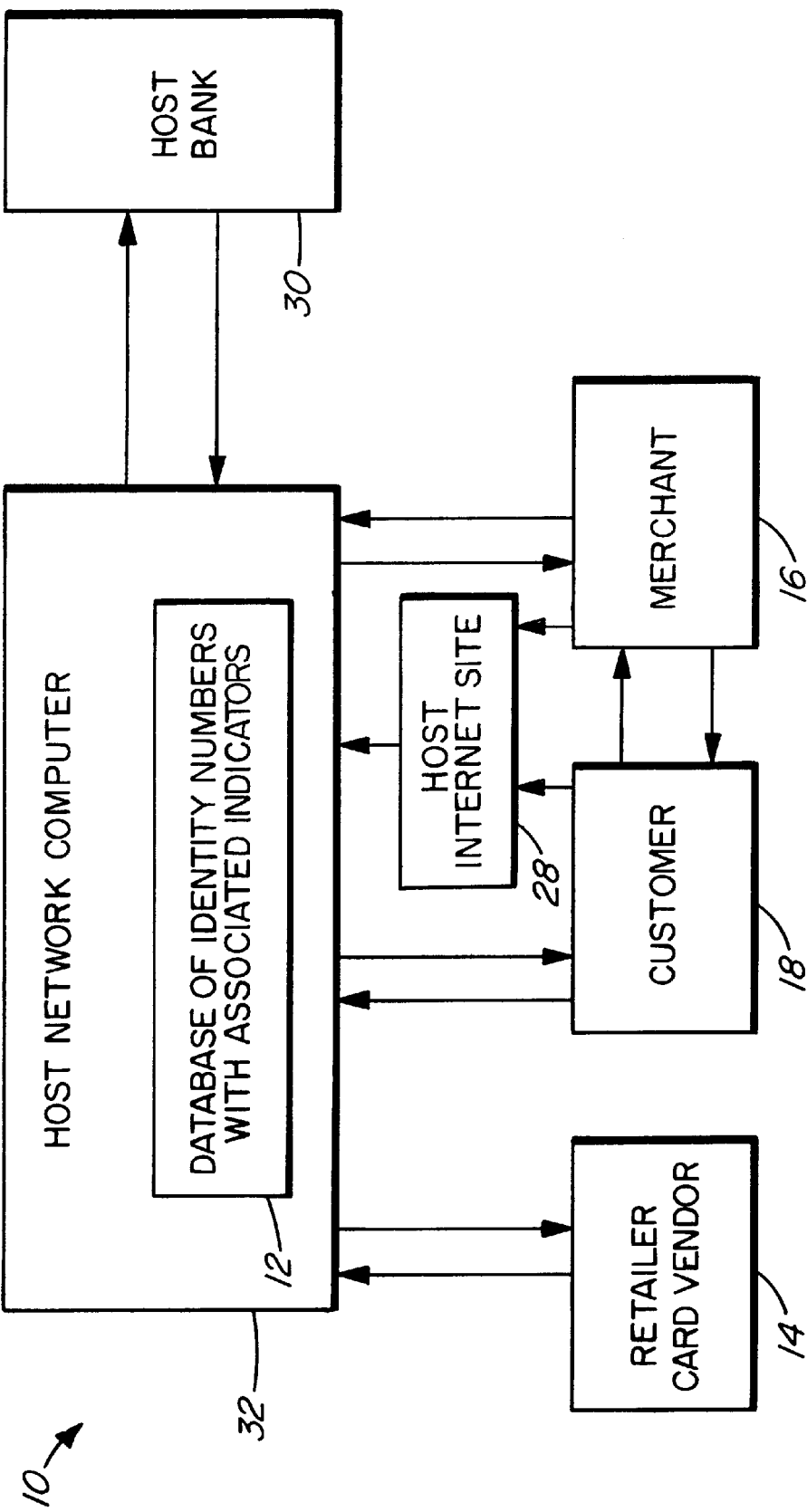
FIG. 1 is a diagrammatical illustration of a pre-paid card system for purchasing products or services on the Internet.

Referring to FIG. 1, reference numeral 10 generally indicates a prepaid card system according to the invention. The system 10 comprises a host database 12, a card vendor terminal 14, a merchant station 16 and a customer internet access terminal 18, as well as cash cards 20 for use with the system 10. One such card 20 is illustrated in FIG. 2.

Figure 3:
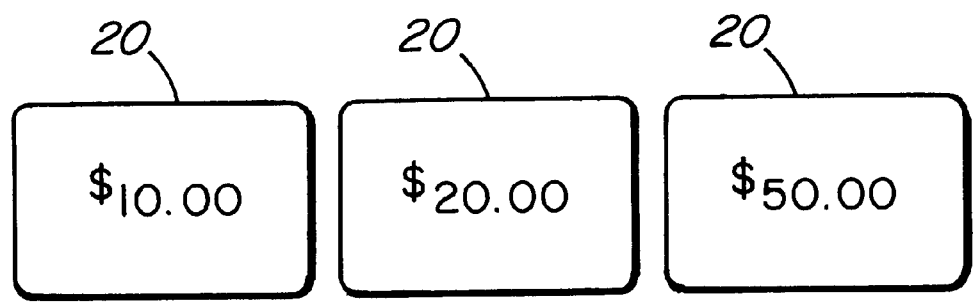
FIG. 3 shows three cards for use with the system of FIG. 1 with different denominations displayed thereon.

The cards 20 are typically of plastic and each card 20 is issued for a specific amount which is displayed on the face of the card 20, e.g. for the following denominations $1, $2, $5, $10, $20, $50, $100 (FIG. 3).

Figure 2:
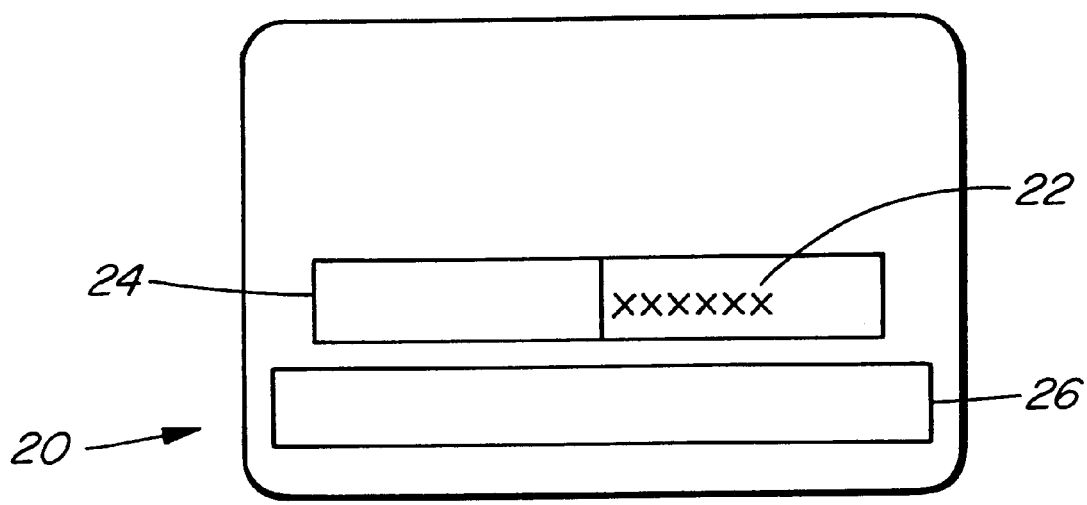
FIG. 2 is a rear view of a card for use with the system of FIG. 1.

Each card 20 further has a unique identity number which is printed on the rear of the card 20, as indicated at 22 in FIG. 2 and covered with a customer or user removable scratch off material, such as an opague tape 24.

Each card 20 is further provided with a magnetic strip 26, which is a read only memory containing the same identity number 22.

The card vendor terminal 14 incorporates a computer which is linked through the Internet or other communication means to the host database 12. The terminal 14 has a card reader for reading the memory on the card 20, such as a swipe slot, for receiving the card 20 and reading the card identification number from the magnetic strip 26. The terminal 14 also includes a keypad for entering various alphanumeric or other control characters, as well as a display and modem, if necessary, for connection to the host database 12.

Figure 4:
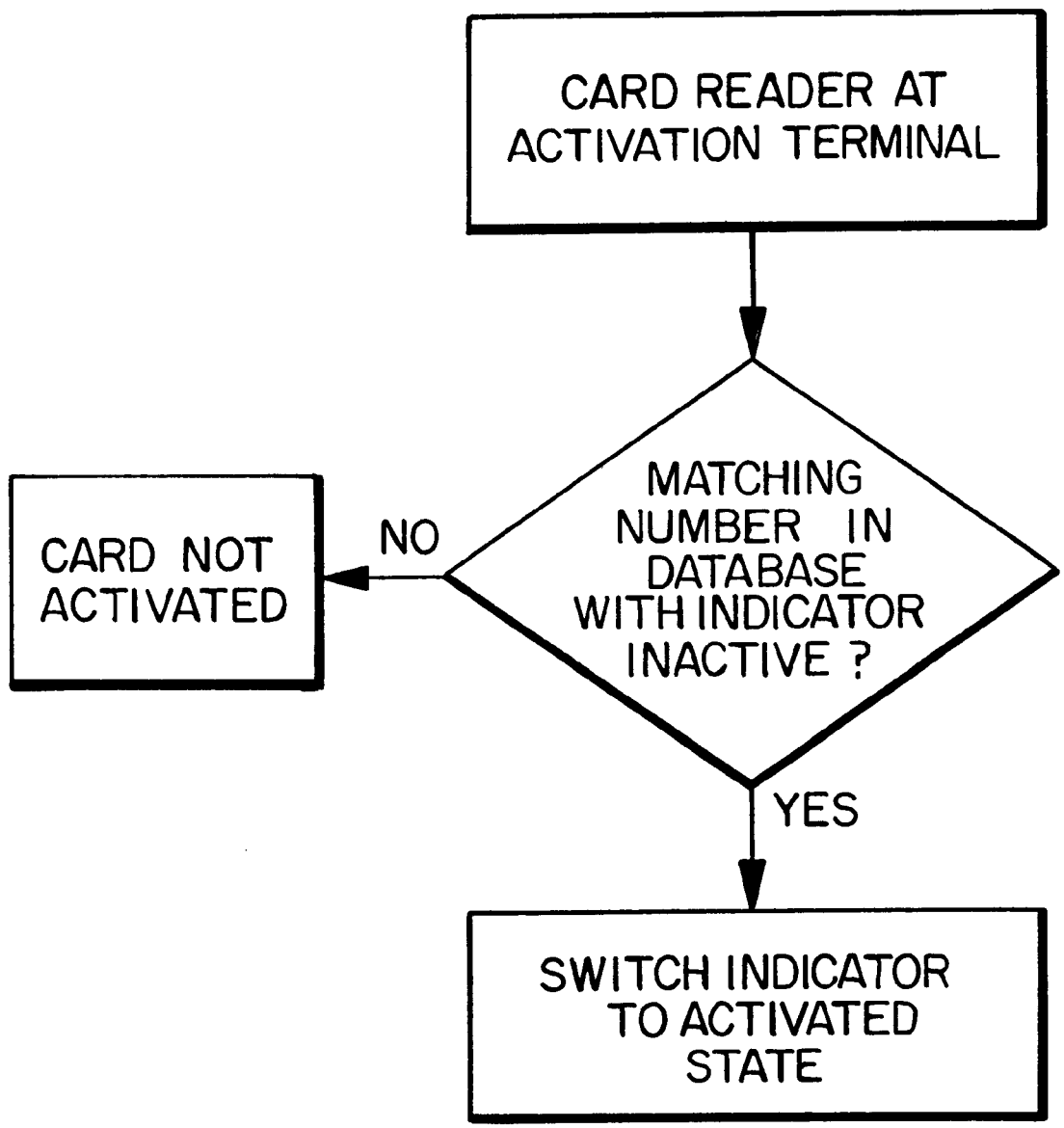
FIG. 4 is a functional flow chart illustrating a part of the system of FIG. 1.

A plurality of vendor terminals 14 are provided at various outlet locations conveniently situated for customers or users of the system to purchase the cards 20. At the time of purchase, the customer will select one or more of the cards 20 with the desired denominations. The cards 20 are inactive prior to sale and are activated when read by the card reader (FIG. 4). At this time, the terminal 14 conveys information to the host database 12 that the particular card 20 is now active. Effectively, the card 20 is now comparable to a bank note in the hands of a customer.

The vendor terminals 14 may conveniently also include unattended kiosk type automated card dispensers which permit data entry by the customer to select a card denomination value and to insert payment to activate and dispense a card 20. Customers may also obtain the cards 20 from an automated card dispenser that is connected to a communications line to allow the customer to enter data on a keypad provided to correctly enter the required information prior to card activation and dispensing.

At the time of purchase, the customer may provide an optional personal identification number which is applied as an extension or addition to the original identification number on the card 20. The same code is then applied to every card 20 that the customer purchases which serves as a further security factor in the use of the cards.

For example, the customer may be prompted to select a 4-digit number which is entered into the card vendor terminal 14 when the cash card 20 is sold and activated by the magnetic swiping (or other reading device) procedure. In order to use this card, the 4-digit card code must be provided in addition to the card identification number which renders the card 20 usable by the customer only, unless the code is made available to someone else.

The merchant station 16 will typically include an internet website advertising the goods or services for sale. In order to participate in the system 10, the merchant will be registered in the host database 12 and provided with an identification number or other identification means. The merchant is also provided with an account in the host database 12, as well as at a host bank 30, participating in the system 10. Thus, the merchant is able to produce a reference number to identify the goods or services which a particular customer is purchasing, as well as the identification number of the cash card(s) 20. Although only one merchant station 16 is shown in FIG. 1, there may be a multiplicity of merchants, each with a station 16, registered with the host database 12.

Figure 6:
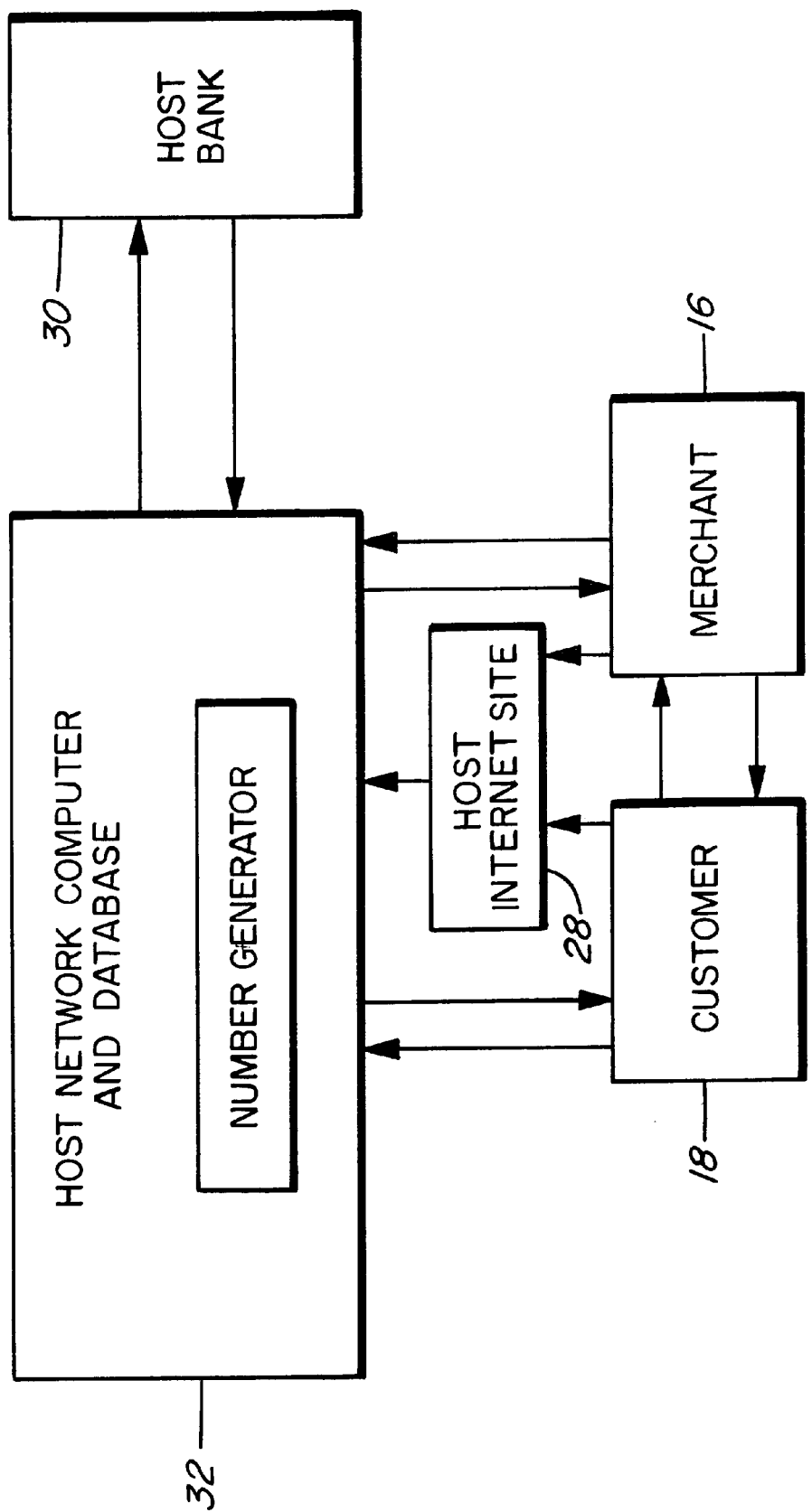
FIG. 6 is a diagrammatical illustration of a pre-paid system according to another embodiment of the invention.

The customer may also elect to register with the host database 12 and open a customer account at the host bank 30 which will enable the customer to purchase virtual cash cards over the network, using his or her credit card or other payment means. The virtual cash card is similar to the cash card 20 except that it does not exist physically but is merely represented by its identification number. In this case the system includes a number generator 27 (FIG. 6) for generating a plurality of unique identity numbers associated with different purchasing values. Registration may also enable a customer to accummulate monetary credits when a purchase is made with a card 20 having a value greater than the purchase price of the product or service. In such a case, therefore, instead of forfeiting the difference, the customer's account is credited with the amount.

When opening the account, the customer may elect to provide a card code, as referred to above, which will then automatically be applied to any virtual cash card purchased by the customer.

The system may also include a host internet website 28 which is in communication with the host database 12 and which is available to customers who are registered with the host database 12 (members) or customers who are not registered (non-members) to browse. This website may also be used by customers, merchants and prospective card vendors to register to participate in the system 10, although card vendors are not necessarily restricted to internet access.

Customers who are registered may also be accorded extra privileges and services, such as an account at the host bank 30 with the facility of making deposits and withdrawals in the form of virtual cash cards, as well as information regarding account balance.

The host website may further include directories regarding the goods and services being offered, as well as the registered merchants. Advertising facilities can also be provided for customers or merchants on the website.

The host bank 30 may be of a registered federal bank type to which the database 12 has access for effecting the necessary transfers between accounts.

A customer will typically have his/her own computer system 18, or other communications equipment, which is connected to the internet and will browse the merchant websites and select goods or services at the merchant websites.

For example, the merchant website may include a purchase form which is completed by the customer which makes provision for the entry of the identification number(s) of the card or cards 20 being used for the purchase, as well as for entry of a number or code identifying the goods or services being purchased.

Figure 5:
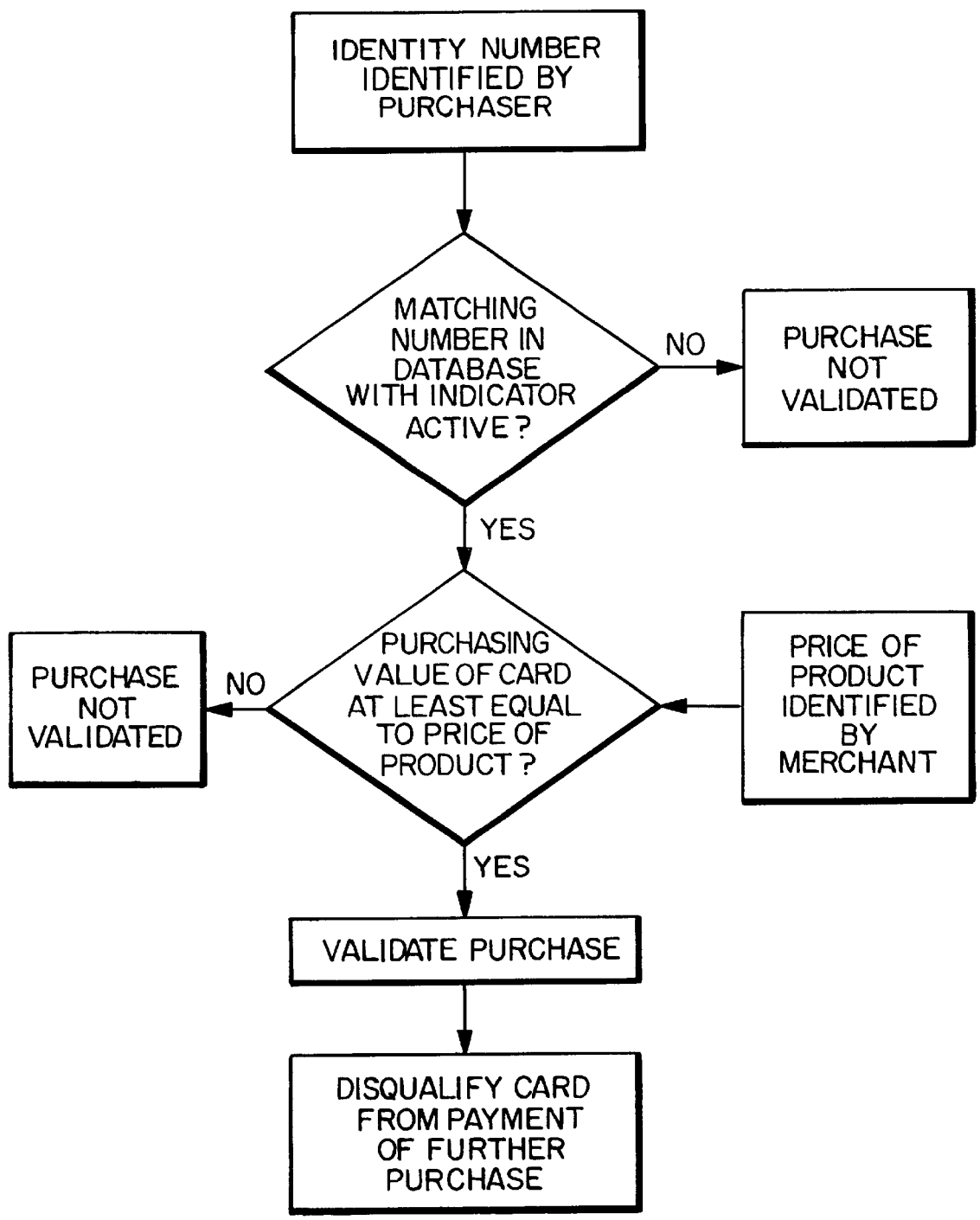
FIG. 5 is a functional flow chart illustrating another part of the system of FIG. 1.

These entries are then sent from the merchant station 16 to the host database 12 or processing station connected to the host database 12, where the information is checked and verified, e.g. that the card(s) 20 is active and that the merchant is a recognized registered merchant (FIG. 5). Preferably, the purchase form that is provided to the customer to enter the card identification number is provided only by the host database or website. The merchant website, therefore, provides only a link that directs the customer to the host database or website to avoid the merchant from actually accessing the card identification numbers, for security purposes.

If all the entries are complete and verified, the transaction is complete and the host database 12 processes the remainder of the transaction for accounting, billing and tracking. At this time, the merchant is notified of a successful sale and is prompted to respond according to the type of purchase by notifying the customer of the details of purchase, purchase reference number, delivery date, access code and other details, as desired. At the same time, the host database 12 issues a transaction number to the customer e-mail, if the customer is registered with the host database 112. This transaction number serves as a type of receipt and can also be made available to non-registered customers if they elect to provide the necessary information during the execution of a transaction.

If goods are purchased, a goods oriented number is generated which requires that the merchant instantly notifies the customer upon completion of the transaction, via E-mail, of the expected delivery date and a customer contact link for questions and help.

If services are purchased, s services type reference number is generated which requires the merchant to notify the customer upon completion, via Email or by other means on the merchant website, details of access to the requested services, such as in the form of a password.

After a predetermined minimum period of time, payment is transferred at the host bank 30 from the system account to the merchant account.

The cash cards 20 do not have a declining balance and are designed for one-time use only. According to a further aspect of the invention, any difference between the cash value of a card 20 and the purchase price can be credited to a general account at the host bank which may be used for any designated purpose; eg. as a donation to a host or customer or to a specified charity. Alternatively the difference may be credited to a customer's account at the host bank, as indicated above.

The host website may therefore also display information regarding the amounts being donated to charities. As mentioned above, the cash cards 20 are for one time use only. All payments are rounded off to the next highest dollar. Fractions of a dollar are regarded as overpayments which can be directed to the special account designated for donations to a charity.

The host database 12 comprises a general purpose computer 32 running a multi-tasking operating system to perform the functions of the system 10. The host computer 32 has sufficient storage to maintain a record of all transactions and functions performed by the system 10 and controls the operation of the system 10.

The host computer will typically perform functions, such as reference/transaction number management, cash card identification number inventory and control.

For added security, a dedicated telecommunications network (host telecom network) may be specifically set up to connect the host database 12 with the vendor terminal(s) 14 and the host internet website. In addition, customers may also be provided with limited access to the host telecom network.

While only preferred embodiments of the invention have been described herein in detail, the invention is not limited thereby and modifications can be made within the scope of the attached claims.

What is claimed is:

1. A pre-paid card system for purchasing products or services, comprising:
    a plurality of cards, each card having a unique identity number associated therewith, the cards being in an activated state and further having different purchasing values, for one-time use only;
    a host computer provided with a database for storing the identity numbers of the cards and their associated one-time purchasing values and including an indicator corresponding with each identity number which indicator can be switched between an activated state in which the card associated with the status is available for use in the payment of goods or services and an inactive state, in which the card associated with the status is not available for use in payment for goods or services;
    at least one merchant computer associated with a merchant offering a product or service for sale, said merchant computer being provided with a database containing details of said product or service for sale, including the price of the product or service;
    means for receiving input from a purchaser identifying the product or service of said merchant being purchased and identifying the identity number of a card for use in payment of the purchase;
    means for transferring the identity number identified by said purchaser to the host computer; and
    means for comparing the identity number identified by the purchaser with the identity numbers in the database of the host computer for matching the identity number identified by the purchaser with an identity number in the database of the host computer to validate the purchase if a matching identity number with a corresponding indicator in the activated state is found and the identity number which is associated with said card having a purchasing value that is at least equal or larger than the price of the product or service being purchased, and subsequently disqualifying the identity number for payment of a further purchase, irrespective of whether the purchasing value of the identity number is equal to or larger than the purchase price, by switching said indicator to an inactive state.

2. The system according to claim 1, wherein each card is further provided with its associated identity number in a visually recognizable form thereon, concealed by a user removable strip.

3. The system according to claim 1, further comprising means for modifying the identity number of a card by the addition of a user-specified security number thereto.

4. The system according to claim 1, wherein each card has its one-time purchasing value displayed thereon.

5. The system according to claim 1, further comprising a readable memory on the card containing the identity number.

6. The system according to claim 5, wherein the readable memory on the card comprises a magnetic strip and said means for reading the identity number of a card comprises a card reader.

7. The system according to claim 5, wherein the host computer, said at least one terminal and said at least one merchant computer are connected together in a network.

8. The system according to claim 7, wherein the network comprises the Internet.

9. The system according to claim 5, wherein the indicator corresponding with the identity number of each card is initially in the inactive state and further comprising:
    at least one activation terminal provided with a means for reading the identity number of a card from the memory on the card;
    means for connecting the terminal to the host computer to transfer the identity number which has been read from the card to the host computer; and
    means for comparing the identity number transferred from the activation terminal with the identity numbers in the database of the host computer for matching the transferred identity number with an identity number in the database and switching the corresponding indicator from said inactive to said activated state if a matching identity number with a corresponding indicator in the inactive state is found.

10. A system for purchasing products or services, comprising:

a host computer having means for generating a plurality of unique identity numbers being in an activated state and associated with different purchasing values, for one-time use only, the host computer further being provided with a database for storing the computer generated identity numbers and their associated one-time purchasing values;

at least one merchant computer associated with a merchant offering a product or service for sale, said merchant computer being provided with a database containing details of said product or service for sale, including the price of the product or service;

means for receiving input from a purchaser identifying the product or service of said merchant being purchased and identifying one of said computer generated identity numbers for use in payment of the purchase;

means for transferring the identity number identified by said purchaser to the host computer; and means for comparing the identity number identified by the purchaser with the identity numbers in the database of the host computer for matching the identity number identified by the purchaser with an identity number in the database of the host computer to validate the purchase if a matching identity number is found and the identity number is associated with a purchasing value that is at least equal to or larger than the price of the product or service being purchased and subsequently disqualifying the identity number for payment of a further purchase, irrespective of whether the purchasing value of the identity number is equal to or larger than the purchase price, by switching said indicator to an inactive state.

11. The system according to claim 10, wherein the host computer and said at least one merchant computer are connected together in a network.

* * * * *